US006761475B2

United States Patent
Perlo et al.

(10) Patent No.: US 6,761,475 B2
(45) Date of Patent: Jul. 13, 2004

(54) LIGHTING DEVICE, PARTICULARLY A MOTOR VEHICLE LIGHT OR EMERGENCY LIGHT

(75) Inventors: Piero Perlo, Sommariva Bosco (IT); Piermario Repetto, Turin (IT); Sabino Sinesi, Piossasco (IT); Davide Capello, Turin (IT); Daniele Pullini, Venaria (IT); Denis Bollea, Fiano (IT)

(73) Assignee: C.R.F. Società Consortile Per Azioni, Turin (IT)

( * ) Notice: Subject to any disclaimer, the term of this patent is extended or adjusted under 35 U.S.C. 154(b) by 0 days.

(21) Appl. No.: 10/145,758

(22) Filed: May 16, 2002

(65) Prior Publication Data

US 2002/0172052 A1 Nov. 21, 2002

(30) Foreign Application Priority Data

May 18, 2001 (IT) ..................................... TO2001A0461

(51) Int. Cl.[7] ................................................ B60Q 1/00
(52) U.S. Cl. ....................... 362/511; 362/297; 362/299; 362/300; 362/346; 362/800
(58) Field of Search ............................... 362/541, 511, 362/800, 299, 300, 346, 297

(56) References Cited

U.S. PATENT DOCUMENTS

| | | | | |
|---|---|---|---|---|
| 4,941,074 A | * | 7/1990 | DeCosse et al. | 362/61 |
| 5,150,960 A | * | 9/1992 | Redick | 362/83.2 |
| 5,434,754 A | * | 7/1995 | Li et al. | 362/31 |
| 5,506,929 A | * | 4/1996 | Tai et al. | 385/146 |
| 6,024,462 A | * | 2/2000 | Whitehead | 362/31 |
| 6,026,602 A | * | 2/2000 | Grondal et al. | 40/570 |
| 6,099,156 A | * | 8/2000 | Jenkins et al. | 362/511 |
| 6,102,559 A | * | 8/2000 | Nold et al. | 362/558 |
| 6,367,957 B1 | * | 4/2002 | Hering et al. | 362/511 |
| 6,415,531 B1 | * | 7/2002 | Ohtsuki et al. | 36/31 |
| 6,637,923 B2 | * | 10/2003 | Amano | 362/545 |
| 6,672,746 B2 | * | 1/2004 | Amano | 362/545 |

* cited by examiner

*Primary Examiner*—Alan Cariaso
*Assistant Examiner*—Jacob Y. Choi
(74) *Attorney, Agent, or Firm*—Sughrue Mion, PLLC

(57) ABSTRACT

A lighting device, comprising a luminous source consisting of a LED (5) that is placed between the flanges (2,3) of a primary reflector (1), which is essentially V-shaped. A secondary reflector (7), composed of an elongated element with steps (8), runs along the extension of one of the flanges (3) of the primary reflector (1), while an elongated transparent diffuser (9) runs along the extension of the other flange (2).

4 Claims, 1 Drawing Sheet

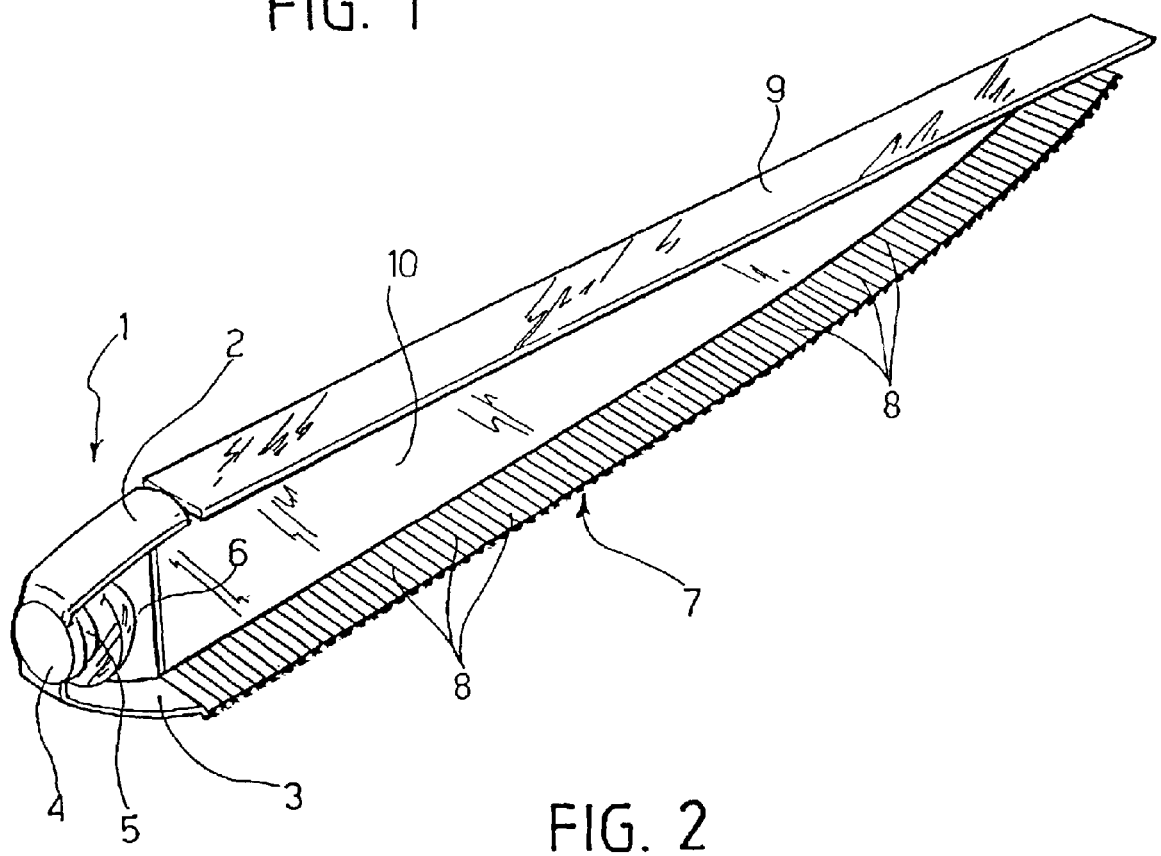
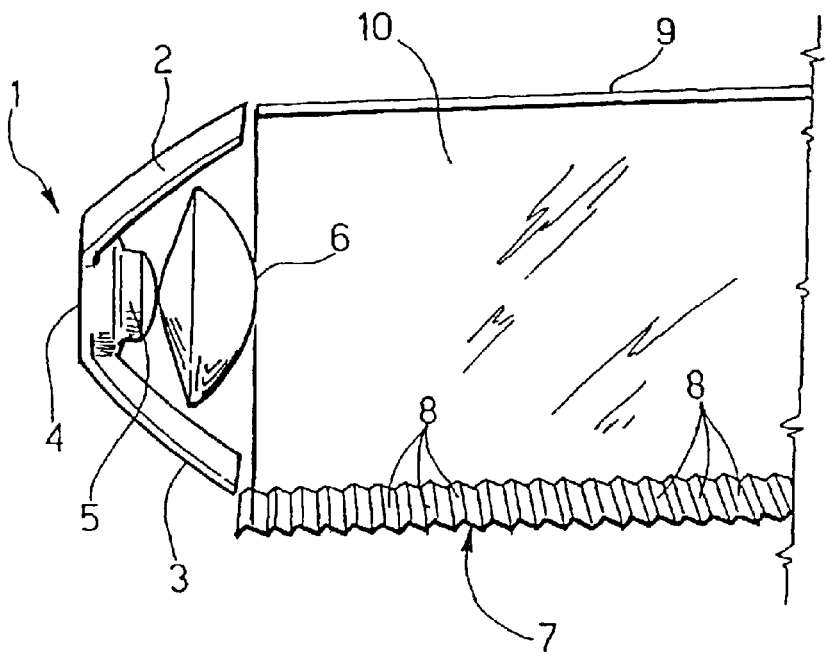

LIGHTING DEVICE, PARTICULARLY A MOTOR VEHICLE LIGHT OR EMERGENCY LIGHT

FIELD OF THE INVENTION

The present invention relates to a lighting device of the type that comprises a luminous source, a primary reflector, a secondary reflector, and a transparent diffuser.

SUMMARY OF THE INVENTION

The purpose of this invention is to implement a lighting device of the type above mentioned, which is especially designed for use inside a motor vehicle light, more specifically, inside the "third stop-light", or inside an emergency light device, and has a simple, compact structure, while being nevertheless capable of providing high performance.

According to the invention, the lighting device is essentially characterized in that:

the luminous source is composed of a LED type punctiform source, the primary reflector is essentially V-shaped with two flanges, between which said LED is placed, the secondary reflector comprises an elongated element with steps, which runs along the extension of one of the flanges of the primary reflector, and, the transparent diffuser is also composed of an elongated element that runs along the extension of the other flange of the primary reflector.

In conformity with another characteristic of the invention, an optical lens capable of collimating the luminous beam produced by said LED can be suitably placed in front of the LED.

As previously explained, according to the invention, the shape of the lighting device makes it especially effective for application to the red rear light and particularly the "third stop-light" of motor vehicles.

BRIEF DESCRIPTION OF THE DRAWINGS

The invention is described below in detail, with reference to the attached drawings, which are provided by way of example in a non-limitative manner, in which:

FIG. 1 shows a schematic perspective view of a lighting device, in conformity with the invention, and FIG. 2 shows a larger scale, raised side view of a portion of FIG. 1.

DETAILED DESCRIPTION OF THE INVENTION

With reference to the drawings, according to the invention, the lighting device comprises a primary reflector 1 that is substantially V-shaped, composed of two flanges 2,3, whose internal surfaces are arched, and which are connected by a yoke 4 by which a punctiform luminous source is placed. Said luminous source is suitably composed of a LED (light-emitting diode) 5, in front of which an optical lens 6 is placed to collimate the luminous beam generated by it.

The number 7 indicates a secondary reflector composed of an elongated element with stepped sections 8, which runs along the extension of the flange 3 of the primary reflector 1.

A transparent diffuser 9 runs along the extension of the other flange 2 of the primary reflector 1, and faces the secondary reflector 7, which is also composed of an elongated element, as known, made up of micro-optical diffusers; these are not illustrated as technicians in this sector are familiar with them. The transparent diffuser 9 is more suitably composed of two-level binary diffracting optics of the micro-fresnel or microlens type, which are diffused according to a preset angle.

A longitudinal element with reflecting flat side wall 10 is placed transversely between the secondary reflector 7 and the transparent diffuser 9. This element with side wall 10 is suitably and completely incorporated into said secondary reflector 7, usually through the molding of suitable plastic material, whose surface is then coated with metal.

During operation, the light produced by the LED 5 is collimated by the lens 6, and mostly collected in a controlled manner by the primary reflector 1. The light is aimed towards the secondary reflector 7 and then deflected, through the steps 8, towards the transparent diffuser 9.

The pitch, i.e. the distance between the steps 8 of the secondary reflector 7, can be varied so as to cast a substantially uniform light on the transparent element 9.

Naturally, the construction details and the implementation methods can vary extensively with respect to what is described and illustrated, without going beyond the scope of the present invention, as defined in the claims that follow.

Thus, according to a variant which is not illustrated, the lens 6 can be eliminated: in this case, the punctiform luminous source 5 is turned 90° with respect to the example illustrated so as to face the first portion of the secondary reflector 7, which consists of a suitably designed mirror.

What is claimed is:

1. A lighting device comprising a luminous source (5), a primary reflector (1), a secondary reflector (7), and a transparent diffuser (9) wherein the luminous source consists of a LED punctiform source (5), the primary reflector (1) is essentially V-shaped and has two flanges (2, 3), between which said LED (5) is placed;

the secondary reflector (7) is composed of an elongated element with steps (8), which runs along the extension of one of the flanges (3) of the primary reflector (1);

the transparent diffuser (9) is also composed of an elongated element which runs along the extension of the other flange (2) of the primary reflector (1) directly opposite the steps of the primary reflector and a collimating optical lens (6) placed in close proximity to the front of the LED (5) between the flanges of the V-shaped primary reflector.

2. A lighting device according to claim 1, wherein said transparent diffuser (9) is composed of two-level binary diffracting optics of the micro-fresnel or microlens type, which are diffused according to a preset angle.

3. A lighting device according to claim 1, further comprising an element with reflecting flat side wall (10) placed between and perpendicular to said secondary reflector (7) and said transparent diffuser (9).

4. A lighting device according to claim 3, wherein said element with flat side wall (10) is completely incorporated into said secondary reflector (7).

* * * * *